J. T. BENTHALL.
PEANUT PICKER AND STEMMER.
APPLICATION FILED FEB. 20, 1909.
925,983.
Patented June 22, 1909.
4 SHEETS—SHEET 1.
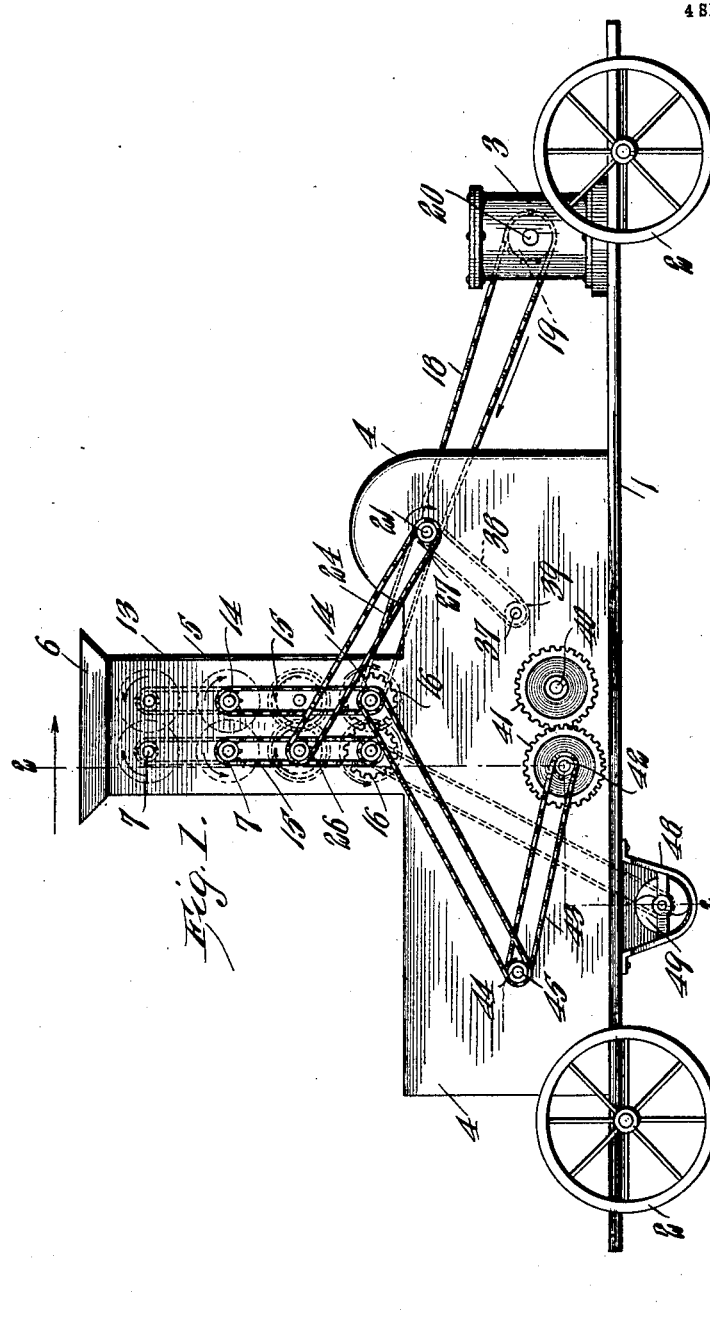
WITNESSES
INVENTOR
JESSE T. BENTHALL
BY
ATTORNEYS

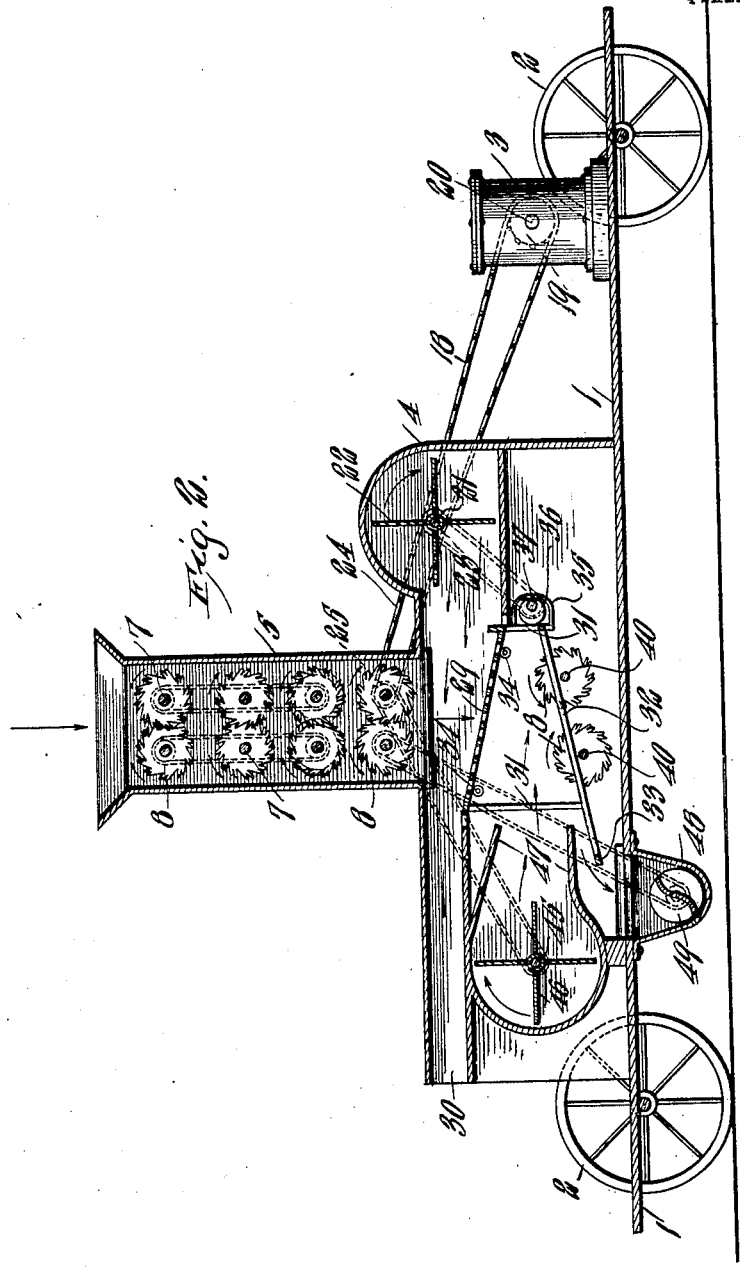

J. T. BENTHALL.
PEANUT PICKER AND STEMMER.
APPLICATION FILED FEB. 20, 1909.
925,983.
Patented June 22, 1909.
4 SHEETS—SHEET 3.
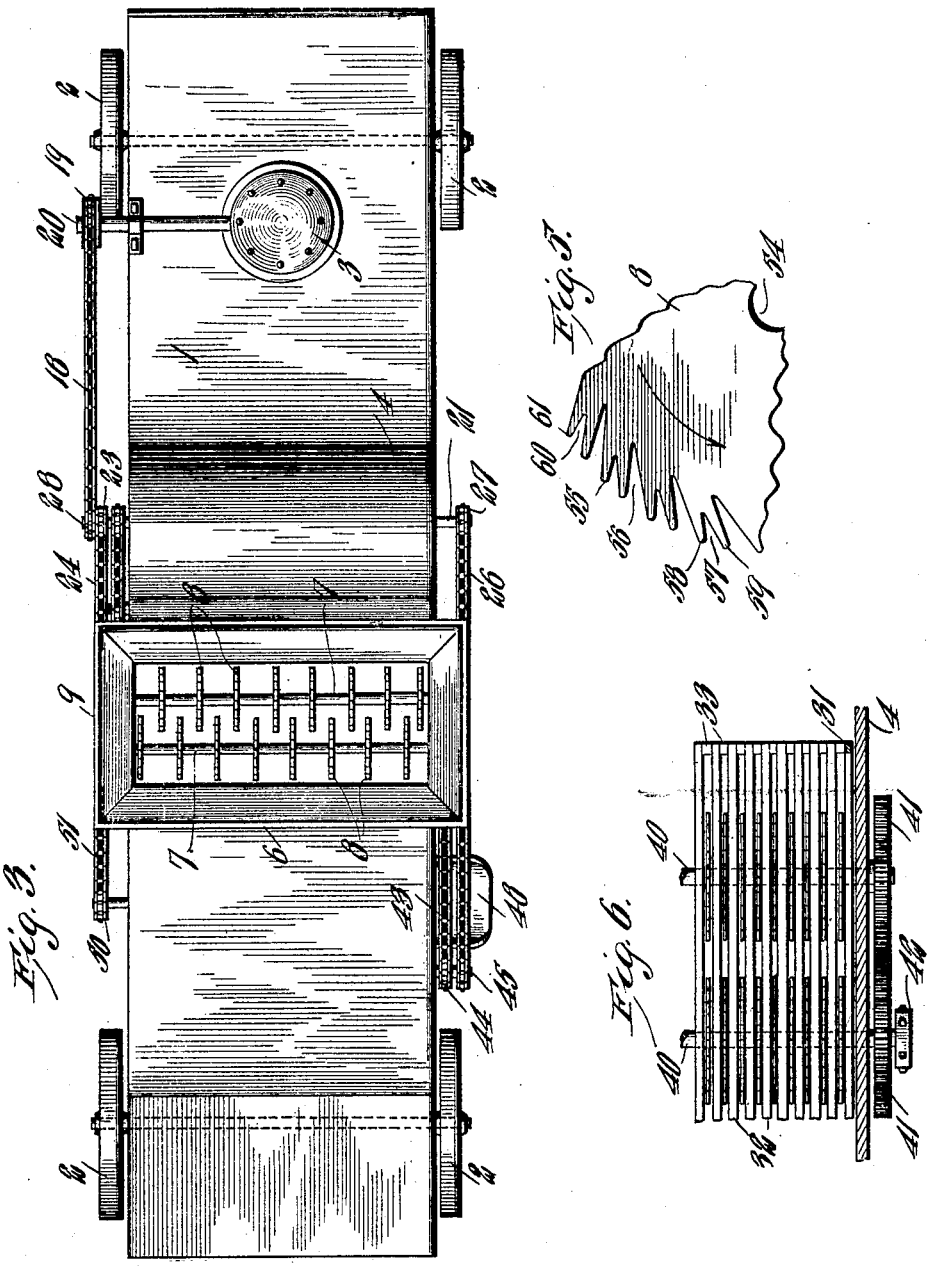
WITNESSES
E. A. Callaghan
C. E. Trainor
INVENTOR
JESSE T. BENTHALL
BY Munn & Co.
ATTORNEYS

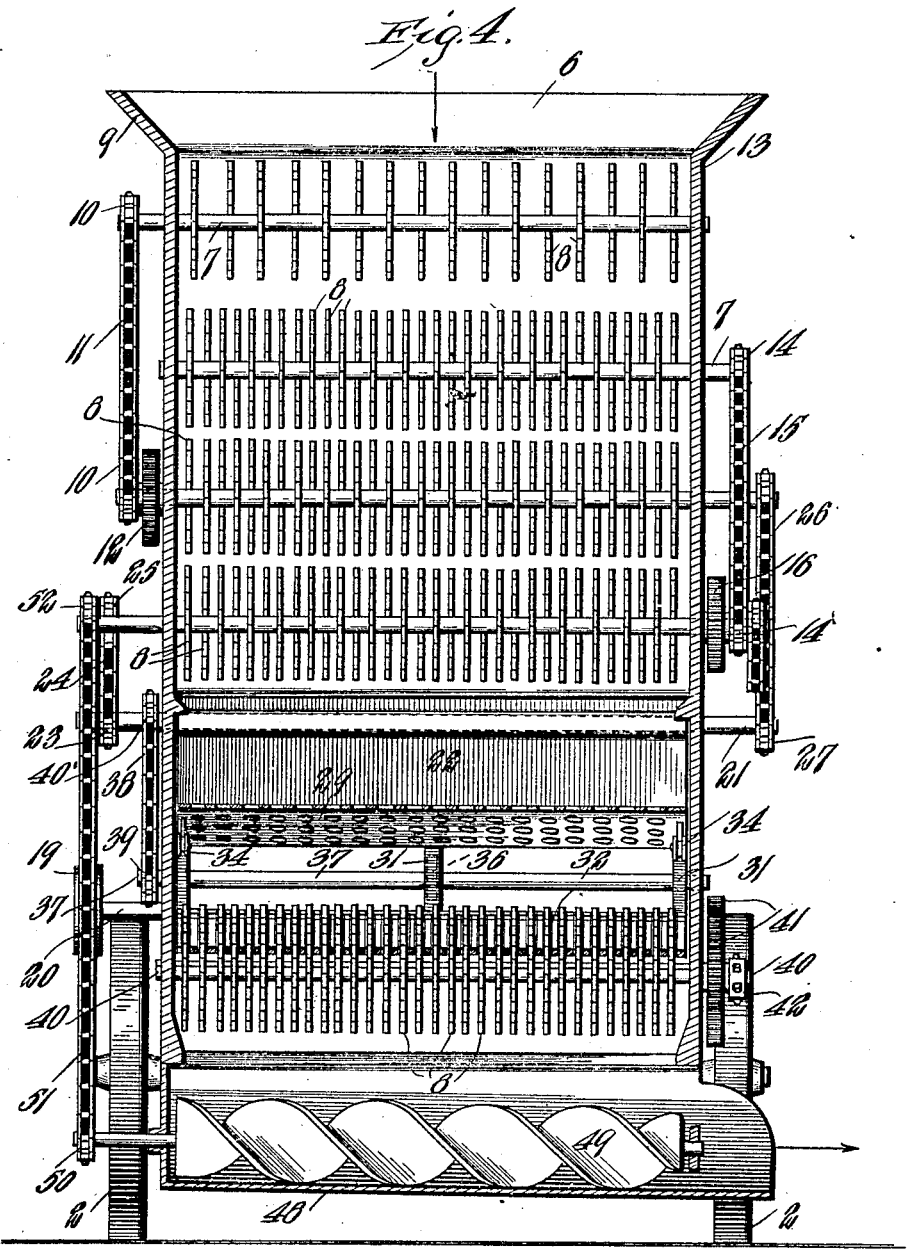

UNITED STATES PATENT OFFICE.

JESSE T. BENTHALL, OF SUFFOLK, VIRGINIA.

PEANUT PICKER AND STEMMER.

No. 925,983.  Specification of Letters Patent.  Patented June 22, 1909.

Application filed February 20, 1909. Serial No. 479,141.

*To all whom it may concern:*

Be it known that I, JESSE T. BENTHALL, a citizen of the United States, and a resident of Suffolk, in the county of Nansemond and State of Virginia, have made certain new and useful Improvements in Peanut Pickers and Stemmers, of which the following is a specification.

My invention is an improvement in peanut pickers and stemmers and consists in certain novel constructions and combinations of parts hereinafter described and claimed.

Referring to the drawings forming a part hereof—Figure 1 is a side view of the improvement; Fig. 2 is a longitudinal section; Fig. 3 is a plan view; Fig. 4 is a section on the line 4—4 of Fig. 2; Fig. 5 is an enlarged side view of a portion of one of the picking disks, and Fig. 6 is a plan view of a portion of the stemming device.

The present embodiment of the invention comprises a platform 1, supported at each end by wheels 2, and having mounted upon one end thereof a suitable motor 3. The carriage also supports a casing 4, within which is contained the stemming device and the said casing is provided with an extension 5 for containing the picking device, the extension having a hopper top 6 for receiving the vines.

A plurality of vertical series of mandrels 7 are journaled in the extension 5 of the casing, and upon each of the mandrels is mounted a series of toothed disks 8. The series are arranged in parallel vertical planes, and consist in the present instance of four mandrels each, the members of one series corresponding in vertical position to the members of the other series.

The disks upon the corresponding mandrels of each series are arranged in staggered and overlapping relation as shown in Figs. 2 and 3, and are of a construction to be presently described.

The ends of the alternate pairs of mandrels are extended at one side of the extension 5, as at 9, and provided with sprocket wheels 10, the corresponding members of the pairs being connected by sprocket chains 11, and with gear wheels 12, the gear wheels of one member of each pair meshing with the gear wheel of the other member. The alternate pairs of members have their ends extended upon the opposite side of the extension 5 as at 13, and are provided with sprocket wheels 14 similarly connected by sprocket chains 15, and with gear wheels 16, the gear wheel of the mandrel of one pair meshing with the gear wheel of the mandrel of the other pair.

A fan shaft 21 provided with a fan 22 is arranged below and in front of the lower opening of the extension 5 within the casing 4, and the outer end of the shaft is provided with a sprocket wheel 23 connected by a sprocket chain 24 with a sprocket chain 25 on the mandrel of a member of one of the alternate pairs.

A mandrel of one of the intermediate pairs is connected by a sprocket chain 26 with another sprocket wheel 27 on the fan shaft, and the fan shaft is provided with a sprocket wheel 28 connected by a sprocket chain 18 with a sprocket wheel 19 on the shaft 20 of the motor. The mandrel bearing the sprocket wheel connected by the chain 26 with the fan shaft is in the opposite series from the mandrel bearing the sprocket wheel 16 connected by the sprocket chain 26 with the fan shaft, so that the alternate pairs of mandrels will be rotated in a direction directly opposite to that in which the intermediate pairs are rotated.

Directly below the lower opening of the extension 5 is arranged an inclined screen 29, the upper face of the screen being inclined toward the fan 22 so that the current of air delivered therefrom passes against and over the screen, and behind the screen at the rear end thereof is an outlet passage 30 for the vine.

The screen 29 is supported by standards 31 connected with the vibrating portion of the stemming device to be presently described, the said vibrating portion being inclined in the opposite direction to the screen as clearly shown in Fig. 2.

The vibrating portion of the stemming device above mentioned consists of a series of parallel longitudinal bars 32 connected at their ends by cross bars 33, and supported by friction rollers 34 arranged within the casing. To one end of the frame or vibrating portion is connected a strap 35 on an eccentric 36 secured to a shaft 37 journaled in the frame, and driven by a belt 38 connecting a sprocket wheel 39 on the said shaft with a sprocket wheel 44 on the fan shaft.

A plurality of mandrels 40 are journaled in the casing below the frame, and the said mandrels are provided on their ends outside of the casing with gear wheels 41 meshing with each other, and one of said shafts is provided with a sprocket wheel 42 connected by a sprocket chain 43 with a sprocket wheel 44 on a fan shaft 45 journaled at the rear of the frame and provided with a fan 46 delivering between the screen 29 and the vibrating frame, the current of air being controlled by guides 47 as shown in Fig. 2. Each of the mandrels 40 is provided with a plurality of toothed disks preferably similar to the disk 8 above mentioned, or to those shown and described in my prior patent No. 890,401, of June 9, 1908, the stemmer shown and described being substantially the same as that shown and described in my said prior patent.

Below the delivery end of the stemming device, is arranged a conveyer of any desired construction, the said conveyer comprising in the present instance a trough 48, and a screw auger conveyer 49 journaled therein, the end of the auger being provided with a sprocket wheel 50 connected by a sprocket chain 51 with a sprocket wheel 52 on the extended end of one of the shafts 40. Any suitable form of carrier may be provided for receiving the picked and stemmed nuts from the conveyer and delivering them at any suitable point.

The toothed disks above mentioned are of the form shown in Fig. 5, each consisting of a body portion provided with a central aperture 54 for receiving the mandrel, and with a plurality of teeth 55, which are inclined to radii of the disk. The sides of the throat between the teeth are arranged at an acute angle with respect to each other as shown at 56, whereby to wedge the stems and the vines between the sides of the throat, and the teeth proper are divided as shown at 57 into two fingers 58 and 59, the throat between the fingers having its sides arranged at an acute angle as shown at 60. The free ends of the fingers are rounded as shown at 61 and are entirely devoid of sharp corners or angles whereby the said fingers can have any cutting action upon the nuts. The disks are approximately 7¼ inches in diameter, and are arranged on the upper pair of mandrels at preferably two inch intervals, the disks of the one mandrel being arranged between the disks of the other mandrel and overlapping them about 1¼ inches. As will be evident from the gearing, the members of each pair of mandrels rotate in opposite directions, the first pair rotating toward each other, the second rotating from each other, the third rotating toward each other and the fourth again rotating from each other. When the vines are fed into the hopper top 6, they will be seized by the fingers of the disks and will become partially wedged in the throats between the fingers and the teeth. That portion of the vine which is wedged the tightest will retain its hold and draw the said vine through the other throats stripping the nuts therefrom and passing the vine on into engagement with the next pair of disks. The disengaged nuts and leaves fall through on to the screen 29, the leaves and the vines being blown out through the outlet 30 while the nuts pass through the screen on to the stemming device. The stemming device removes the stems from the nuts, and the nuts pass off the stemming device into the conveyer, the trash being blown over the upper end of the stemming device where it falls through the open bottom of the casing, and the stems are drawn between the bars. The teeth upon all the disks are extended in the direction of rotation of the respective disks. By this arrangement, the teeth of the succeeding pair of disks may easily disengage the vines from the teeth of the preceding pair, since they will be pulled toward the widest part of the throat.

I claim:—

1. An apparatus substantially as described, comprising a casing, screening devices in the casing, a vertical extension projecting upwardly from the casing, a series of superposed pairs of mandrels mounted in the vertical extension, means for turning the mandrels of each pair in opposite directions and for turning the corresponding mandrels of the adjacent pairs in reverse directions, and toothed disks on the mandrels with the disks of each pair alternating and overlapping each other and the teeth of the corresponding disks of the adjacent pairs extending in reverse directions, and the teeth of the several disks extending in the direction of the revolution of their respective disks, all substantially as and for the purposes set forth.

2. A peanut picking and stemming apparatus having a casing provided with a vertical portion and a plurality of superposed pairs of mandrels in said portion means whereby the mandrels of each pair may be turned in opposite directions and the corresponding mandrels of the adjacent pairs may be turned in reverse directions, and toothed disks on the said mandrels substantially as set forth.

3. A peanut picking and stemming apparatus comprising a casing, a pair of picking mandrels in alinement opposite each other, means for turning said mandrels in opposite directions and toothed disks on the said mandrels with the disks on the opposite mandrels overlapping each other and alternating substantially as set forth.

4. In an apparatus substantially as described, a toothed disk having teeth at its periphery with throats between the adjacent teeth, the walls of said throats being formed on straight lines and meeting at an acute angle and the teeth having generally an inclination in the same direction and at an angle to radii of the disk and the said teeth being divided into fingers by an intermediate throat whose walls are on straight lines and are also inclined at an acute angle to each other, the outer ends of the fingers being rounded as and for the purposes set forth.

5. In an apparatus substantially as described, a toothed disk having teeth at its periphery with throats between the adjacent teeth, the walls of said throats meeting at an acute angle and the teeth having generally an inclination in the same direction and at an angle to radii of the disk and the said teeth being divided into fingers by an intermediate throat whose walls are also inclined at an acute angle to each other, the outer ends of the fingers being rounded as and for the purposes set forth.

6. In an apparatus substantially as described, a disk having its periphery formed into a circumferential series of similar teeth and the said teeth divided into similar fingers, the throats between the adjacent teeth being deeper than those separating the adjacent fingers whereby the several teeth will be clearly defined and the outer ends of the fingers being rounded to preclude a cutting or sawing operation, substantially as set forth.

7. In an apparatus substantially as described, a disk having its periphery formed into a series of similar teeth each of said teeth being divided into similar fingers, the throats between the teeth being deeper than those between the fingers, and all of the throats having walls inclined to each other at an acute angle, the outer ends of the fingers being rounded as and for the purpose set forth.

JESSE T. BENTHALL.

Witnesses:
C. A. SHOOP,
C. E. TRAINOR.